United States Patent
Guirlanda

(10) Patent No.: US 11,541,813 B2
(45) Date of Patent: Jan. 3, 2023

(54) APPARATUS AND METHOD FOR ASSISTING A DRIVER OF A VEHICLE WITH VISUALIZATION OF AN AMBIENT ENVIRONMENT

(71) Applicant: ZF FRIEDRICHSHAFEN AG, Friedrichshafen (DE)

(72) Inventor: Christopher Guirlanda, Brighton, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 479 days.

(21) Appl. No.: 16/708,480

(22) Filed: Dec. 10, 2019

(65) Prior Publication Data

US 2021/0170949 A1    Jun. 10, 2021

(51) Int. Cl.
*B60R 1/10*    (2006.01)
*B60R 1/12*    (2006.01)
*H04N 7/18*    (2006.01)

(52) U.S. Cl.
CPC .............. *B60R 1/10* (2013.01); *B60R 1/12* (2013.01); *H04N 7/181* (2013.01); *B60R 2001/1253* (2013.01); *B60R 2300/105* (2013.01); *B60R 2300/802* (2013.01); *B60R 2300/8066* (2013.01)

(58) Field of Classification Search
CPC ..... B60R 1/10; B60R 1/12; B60R 2001/1253; B60R 2300/105; B60R 2300/802; B60R 2300/8066; B60R 2300/302; B60R 2300/70; B60R 1/00; B60R 2300/30; B60R 2300/8073; B60R 2300/8093; H04N 7/181; B60W 50/14; B60W 2050/146
See application file for complete search history.

(56) References Cited

U.S. PATENT DOCUMENTS

2018/0278895 A1* 9/2018 Greenwood .............. B60R 1/00
2020/0254876 A1* 8/2020 Cordell .................. G06V 20/56

* cited by examiner

*Primary Examiner* — James M Pontius
(74) *Attorney, Agent, or Firm* — Tarolli, Sundheim, Covell & Tummino LLP

(57) ABSTRACT

A method of assisting a driver of a vehicle with visualization of an ambient environment comprises generating a mirror image signal corresponding to a field of view of a traditional driving mirror. A surround image signal corresponding to a field of view of an ambient environment adjacent the vehicle is generated. A vehicle speed signal is generated. The mirror image signal, the surround image signal, and the vehicle speed signal are received, and at least one of a driver mirror signal and a driver surround signal is responsively produced. A video image corresponding to at least one of the driver mirror signal and the driver surround signal is selectively displayed to the driver. A frame rate of at least one of the mirror image signal and the surround image signal is adjusted by the signal processor responsive to the vehicle speed signal. A drive assist system is also provided.

12 Claims, 1 Drawing Sheet

APPARATUS AND METHOD FOR ASSISTING A DRIVER OF A VEHICLE WITH VISUALIZATION OF AN AMBIENT ENVIRONMENT

TECHNICAL FIELD

This disclosure relates to an apparatus and method for assisting a driver of a vehicle with visualization of an ambient environment and, more particularly, to a method and apparatus of visual signal processing for desired resource allocation.

BACKGROUND

Vehicle driver assist systems that use a camera to monitor the environment surrounding the vehicle are known. A driver assist system can aid a driver in the operation of a motor vehicle by providing operational information such as a potential collision, lane or roadway departure, location of pedestrians, road sign information, etc. Data from the driver assist system is provided to other vehicle systems to provide the driver with a warning, haptic or tactile feedback, and/or autonomous control of the vehicle.

A driver assist system in a vehicle may include a camera that acquires information and provides the acquired information to a vehicle safety system designed to assist the driver. The camera may be mounted in any desired location in, on, or otherwise associated with the vehicle, such as on the vehicle windshield to ensure a desired field of view. The camera includes a lens. An image sensor on a printed circuit board (PCB) senses the image acquired by the lens.

The driver assist system may include multiple cameras, each used for a specific purpose. For example, one camera could provide a view similar to that of currently known rear-view or side mirrors, while another camera provides a view which is normally not readily perceptible by the driver (e.g., looking downward at a laterally adjacent curb during parallel parking). However, the video signals from each camera must be received, processed, and displayed to the driver, at a cost of additional signal management time, power, and bandwidth for each camera.

SUMMARY

In an aspect, a method of assisting a driver of a vehicle with visualization of an ambient environment is described. The method comprises generating a mirror image signal corresponding to a field of view of a traditional driving mirror. A surround image signal corresponding to a field of view of an ambient environment adjacent the vehicle is generated. A vehicle speed signal is generated. The mirror image signal, the surround image signal, and the vehicle speed signal are received, and at least one of a driver mirror signal and a driver surround signal is responsively produced. A video image corresponding to at least one of the driver mirror signal and the driver surround signal is selectively displayed to the driver. A frame rate of at least one of the mirror image signal and the surround image signal is adjusted by the signal processor responsive to the vehicle speed signal.

In an aspect, a driver assist system is described. A mirror camera is provided for generating a mirror image signal corresponding to a field of view of a traditional driving mirror. A surround camera is provided for generating a surround image signal corresponding to a field of view of an ambient environment adjacent the vehicle. A vehicle speed indicator generates a vehicle speed signal. A signal processor receives the mirror image signal, the surround image signal, and the vehicle speed signal, and responsively produces at least one of a driver mirror signal and a driver surround signal. A driver-perceptible display selectively displays a video image corresponding to at least one of the driver mirror signal and the driver surround signal to the driver. A frame rate of at least one of the mirror image signal and the surround image signal is adjusted by the signal processor responsive to the vehicle speed signal.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that "slowing down"/"speeding up" or "reduced"/"increased" speed are used below for ease of discussion, but it will be understood that such temporally-related terms are relative, and one of ordinary skill in the art will understand how to adjust the present system for various speed, acceleration, and deceleration conditions.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements and actions, these elements and actions should not be limited by these terms. These terms are only used to distinguish one element or action from another. For example, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
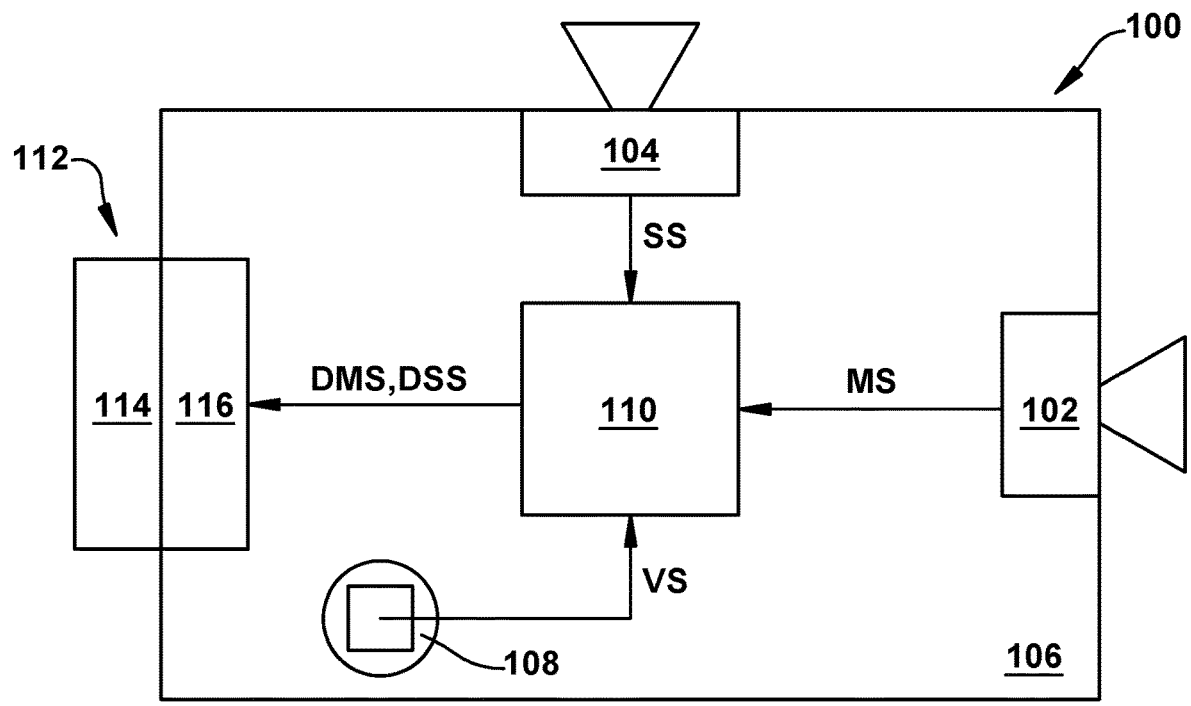
FIG. 1 is a schematic diagram of a driver assist system according to an example aspect of the present invention.

FIG. 1 schematically depicts a driver assist system 100, comprising at least one mirror camera 102 for generating a mirror image signal MS corresponding to a field of view of a traditional driving mirror. At least one surround camera 104 of the driver assist system 100 is provided for generating a surround image signal SS corresponding to a field of view of an ambient environment adjacent the vehicle (shown schematically at 106). A vehicle speed indicator 108 is provided for generating a vehicle speed signal VS. A signal processor 110 is provided for receiving the mirror image signal MS, the surround image signal SS, and the vehicle speed signal VS, and responsively producing at least one of a driver mirror signal DMS and a driver surround signal DSS.

A driver-perceptible display 112 is provided, at any desired location with respect to the vehicle and the driver, for selectively displaying a video image corresponding to at least one of the driver mirror signal DMS and the driver surround signal to the driver DSS. The driver-perceptible display 112 may include, for example, a video mirror display 114 for displaying the driver mirror signal DMS and a separate video surround display 116 for displaying the driver surround signal DSS. Generally, the video mirror display 114 is active the entire time the vehicle 106 is in motion (and often during transient non-motion portions of a trip, such as at stop signs). This is because the video mirror display 114 replaces one or more traditional driver rear-view and/or side mirrors.

In contrast, the video surround display 116 is generally only active at relatively low vehicle speeds, such as, but not limited to, parking or backing-up operations when it is desirable to see how close the vehicle is to a curb or wall. This is because it could be distracting or disorienting for a driver to see the ambient highway whizzing by during high-speed travel, in addition to providing little/no useful information to the driver.

Electronic mirror replacement ("E-Mirror") type video mirror displays 114 consume a significant amount of video bandwidth for a system, due to the increased camera resolution and frame rate needed to meet current vehicle regulations in many jurisdictions. For example, one E-Mirror system might use three (3) 2.3 megapixel ("MP") mirror cameras 102 at 60 frames per second (fps). For one (1) image signal processor 110 ("ISP") to handle this video information for the mirror system would require 2300000 pixels×24 bits per pixel×60 frames per second=9.94 gigabits per second (Gbps) to produce a driver mirror signal DMS, which is a significant amount of data for an ISP to handle. An surround camera 104 system could include four (4) 1.2 MP cameras at 30 fps, for example. The video information of this surround system is 1200000 pixels×24 bits per pixel×30 fps=3.46 Gbps. One signal processor 110 would need to have a capacity of up to 13.4 Gbps to handle both the surround and mirror video inputs simultaneously. This is extremely difficult to achieve with one processing video chip. In some systems, there may be calculations needed for both the video input bandwidth and the ISP processing bandwidth, thus further increasing calculation load. However, a two chip approach is expensive to implement, in both materials and power consumption. As a result, the present driver assist system 100 includes a signal processor 110 which adjusts a frame rate of at least one of the mirror image signal MS and the surround image signal SS responsive to the vehicle speed signal VS.

Figure 2:
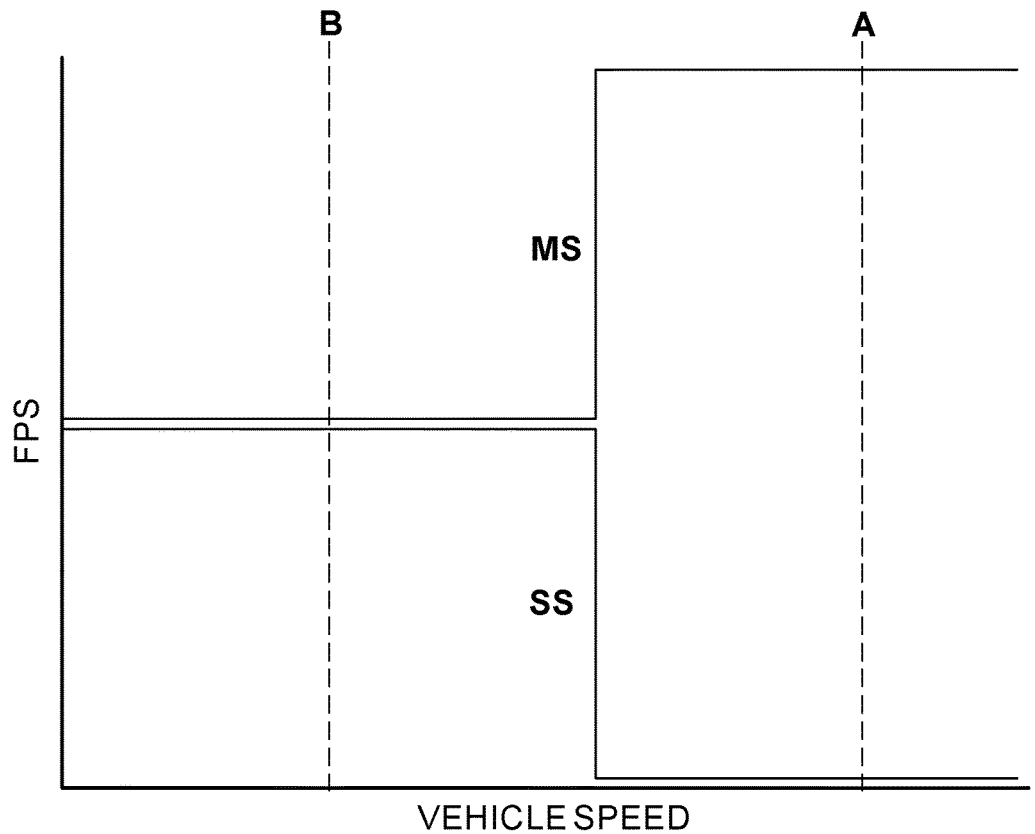
FIG. 2 is a schematic graph of vehicle speed vs. frame rate in an example implementation of the aspect of FIG. 1.

More specifically, and as shown schematically in FIG. 2, the frame rate of at least one of the mirror image signal MS and the surround image signal SS may be reduced from an initial value by at least one of the signal processor 110 and the respective mirror camera 102 or surround camera 104, responsive to the vehicle speed signal VS indicating a reduced vehicle speed from an initial value. As an example, and again with reference to FIG. 2, as the vehicle speed decreases, the frame rate of the mirror image signal MS can be reduced from an initial value by the signal processor 110 responsive to the vehicle speed signal VS indicating a reduced vehicle speed from an initial value, concurrently with the frame rate of the surround image signal SS being maintained at an initial value and/or increased from the initial value.

In most use environments, a high frame rate is desirable for the mirror image signal MS during highway speeds, to reduce latency and allow a driver to experience an "E-mirror" video mirror display 114 that approximates the real-time view of a traditional mirror. At those same highway speeds, the video surround display 116 is not likely to be active, to avoid unnecessarily distracting the driver. This is the situation at dashed-line "A" in FIG. 2. Then, when the vehicle slows down to, for example, street or parking lot speeds, the frame rate for the mirror image signal MS can be reduced because latency is not as impactful at lower speeds than at higher speeds. The surround image signal SS will be active at those lower speeds, to provide the driver with images of ambient conditions to help with, for example, a parking and/or backing operation. This is the situation at dashed-line "B" in FIG. 2. As a result of this speed-dependent frame rate, less total load is placed on the signal processor 110, which may allow for the driver assist system 100 to provide desired image feeds with fewer and/or less powerful image processing chips than in the two-chip example given above.

E.g., in the aforementioned system, for speeds below about 18 KMH (~11 MPH), or at any other desired threshold speed (e.g., about 30 KMH or ~18 MPH), when the latency is not as significant, the frame rate of the mirror cameras 102 could be cut from 60 fps to 30 fps. The reduction in frame rate would allow a signal processor 110 to handle both E-Mirror and Surround view at lower speed, ultimately reducing the need for two image processing chips. This approach could reduce component costs up front, as well as reduce system power consumption over time.

In certain implementations, the signal processor 110 might produce only a selected one of a driver mirror signal DMS and a driver surround signal DSS, responsive to the vehicle speed signal VS. For example, the signal processor 110 might produce only the selected one of the driver mirror signal DMS and the driver surround signal DSS responsive to the vehicle speed signal VS indicating highway driving, and might produces only the other one of the driver mirror signal DMS and the driver surround signal DSS responsive to the vehicle speed signal VS indicating surface street driving. Or, when the vehicle speed signal VS indicates surface street driving and/or a parking situation, the signal processor 110 might produce both of the driver mirror signal DMS and the driver surround signal DSS, but with at least one of those signals being at a frame rate less than that produced during highway driving.

The signal processor 110 could control actuation of a selected one of the mirror camera 102 and the surround camera 104 responsive to the vehicle speed signal VS. For example, the signal processor 110 could deactivate the surround camera 104 responsive to the vehicle speed signal VS being above a predetermined value. It is contemplated, though, that the mirror camera 102 and/or the surround camera 104 could also or instead be active and providing, respectively, the mirror image signal MS and the surround image signal SS to the signal processor 110 at substantially all times during vehicle operation, and the signal processor 110 just disregards or ignores the signal stream from whichever of the mirror camera 102 and the surround camera 104 is not relevant to driving at a given speed.

FIG. 2 shows that the mirror image signal MS and the surround image signal SS change frame rate in a stepwise and "mirrored" manner at a particular speed. However, it is contemplated that the frame rate change of the mirror image signal MS and/or the surround image signal SS could occur more gradually over time and/or could be asymmetrical, as desired for a particular use environment (e.g., responsive to a rate of change of vehicle speed). One of ordinary skill in the art can readily provide a predetermined frame rate change "curve" or "chart", such as the schematic FIG. 2, for a particular use environment, and it is contemplated that multiple such charts could be provided for different situations of a single driver assist system 100.

Accordingly, a method of assisting a driver of a vehicle 106 with visualization of an ambient environment can include generating a mirror image signal MS corresponding to a field of view of a traditional driving mirror (e.g., using a mirror camera 102). A surround image signal SS is generated, corresponding to a field of view of an ambient environment adjacent the vehicle 106. This could be, for example, a downward view showing a curb next to a passenger side of the vehicle to assist with parallel parking. A vehicle speed signal VS is also generated.

The mirror image signal MS, the surround image signal SS, and the vehicle speed signal VS are all received (e.g., by a signal processor 110), and at least one of a driver mirror signal DMS and a driver surround signal DSS is responsively produced. A video image corresponding to at least one of the driver mirror signal DMS and the driver surround signal DSS is selectively displayed to the driver. A frame rate of at least one of the mirror image signal MS and the surround image signal SS is adjusted by the signal processor 110 responsive to the vehicle speed signal VS.

This frame rate adjustment could include reducing the frame rate of a chosen one of the mirror image signal MS and the surround image signal SS from an initial value by the signal processor 110, and/or increasing the frame rate of another one of the mirror image signal MS and the surround image signal SS from an initial value by the signal processor 110, responsive to the vehicle speed signal VS indicating a reduced vehicle speed from an initial value.

The driver mirror signal DMS could be displayed via a video mirror display 114 and/or any other component of driver-perceptible display 112. The driver surround signal DSS could be displayed via a video surround display 116, separate from the video mirror display 114 and/or any other component of driver-perceptible display 112. The surround camera 104 could be deactivated responsive to the vehicle speed signal VS being above a predetermined value, as shown in FIG. 2.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A method of assisting a driver of a vehicle with visualization of an ambient environment, the method comprising:
   generating a mirror image signal corresponding to a field of view of a traditional driving mirror;
   generating a surround image signal corresponding to a field of view of an ambient environment adjacent the vehicle;
   generating a vehicle speed signal;
   receiving the mirror image signal, the surround image signal, and the vehicle speed signal, and responsively producing at least one of a driver mirror signal and a driver surround signal;
   selectively displaying a video image corresponding to at least one of the driver mirror signal and the driver surround signal to the driver; and
   reducing a frame rate of the mirror image signal from an initial value by the signal processor responsive to the vehicle speed signal indicating a reduced vehicle speed from an initial value, concurrently with the frame rate of the surround image signal being at least one of maintained at an initial value and increased from the initial value.

2. A method of assisting a driver of a vehicle with visualization of an ambient environment, the method comprising:
   generating a mirror image signal corresponding to a field of view of a traditional driving mirror;
   generating a surround image signal corresponding to a field of view of an ambient environment adjacent the vehicle;
   generating a vehicle speed signal;
   receiving the mirror image signal, the surround image signal, and the vehicle speed signal;
   adjusting a frame rate of at least one of the mirror image signal and the surround image signal by the signal processor responsive to the vehicle speed signal;
   producing only a selected one of a driver mirror signal and a driver surround signal responsive to the vehicle speed signal indicating highway driving;
   producing only the other one of the driver mirror signal and the driver surround signal responsive to the vehicle speed signal indicating surface street driving; and selectively displaying a video image corresponding to the selected one of the driver mirror signal and the driver surround signal to the driver.

3. A method of assisting a driver of a vehicle with visualization of an ambient environment, the method comprising:
generating a mirror image signal corresponding to a field of view of a traditional driving mirror;
generating a surround image signal corresponding to a field of view of an ambient environment adjacent the vehicle;
generating a vehicle speed signal;
receiving the mirror image signal, the surround image signal, and the vehicle speed signal, and responsively producing at least one of a driver mirror signal and a driver surround signal;
adjusting a frame rate of at least one of the mirror image signal and the surround image signal by the signal processor responsive to the vehicle speed signal;
displaying a first video image to the driver corresponding to the driver mirror signal via a video mirror display; and
displaying a second video image to the driver corresponding to the driver surround signal via a video surround display separate from the video mirror display.

4. A method of assisting a driver of a vehicle with visualization of an ambient environment, the method comprising:
generating a mirror image signal corresponding to a field of view of a traditional driving mirror;
generating a surround image signal corresponding to a field of view of an ambient environment adjacent the vehicle;
generating a vehicle speed signal;
receiving the mirror image signal, the surround image signal, and the vehicle speed signal, and responsively producing at least one of a driver mirror signal and a driver surround signal;
selectively displaying a video image corresponding to at least one of the driver mirror signal and the driver surround signal to the driver;
adjusting a frame rate of at least one of the mirror image signal and the surround image signal by the signal processor responsive to the vehicle speed signal; and
deactivating a surround camera for generating the surround image signal responsive to the vehicle speed signal being above a predetermined value.

5. A driver assist system, comprising:
a mirror camera for generating a mirror image signal corresponding to a field of view of a traditional driving mirror;
a surround camera for generating a surround image signal corresponding to a field of view of an ambient environment adjacent the vehicle;
a signal processor for receiving the mirror image signal, the surround image signal, and a vehicle speed signal, and responsively producing at least one of a driver mirror signal and a driver surround signal; and
a driver-perceptible display for selectively displaying a video image corresponding to at least one of the driver mirror signal and the driver surround signal to the driver;
wherein a frame rate of the mirror image signal is reduced from an initial value by the signal processor responsive to the vehicle speed signal indicating a reduced vehicle speed from an initial value, concurrently with the frame rate of the surround image signal being at least one of maintained at an initial value and increased from the initial value.

6. The driver assist system of claim 5, wherein the frame rate of at least one of the mirror image signal and the surround image signal is reduced from an initial value by the signal processor responsive to the vehicle speed signal indicating a reduced vehicle speed from an initial value.

7. The driver assist system of claim 6, wherein the frame rate of the mirror image signal is reduced from an initial value by the signal processor responsive to the vehicle speed signal indicating a reduced vehicle speed from an initial value, concurrently with the frame rate of the surround image signal being at least one of maintained at an initial value and increased from the initial value.

8. The driver assist system of claim 5, wherein the signal processor produces only a selected one of a driver mirror signal and a driver surround signal, responsive to the vehicle speed signal.

9. The driver assist system of claim 8, wherein the signal processor produces only the selected one of the driver mirror signal and the driver surround signal responsive to the vehicle speed signal indicating highway driving, and produces only the other one of the driver mirror signal and the driver surround signal responsive to the vehicle speed signal indicating surface street driving.

10. The driver assist system of claim 5, wherein the driver-perceptible display includes a video mirror display for displaying the driver mirror signal and a separate video surround display for displaying the driver surround signal.

11. The driver assist system of claim 5, wherein the signal processor controls actuation of a selected one of the mirror camera and the surround camera responsive to the vehicle speed signal.

12. The driver assist system of claim 11, wherein the signal processor deactivates the surround camera responsive to the vehicle speed signal being above a predetermined value.

* * * * *